(12) United States Patent
Lim et al.

(10) Patent No.: US 12,122,397 B2
(45) Date of Patent: Oct. 22, 2024

(54) DEEP LEARNING-BASED VEHICLE TRAJECTORY PREDICTION DEVICE AND METHOD THEREFOR

(71) Applicant: Kookmin University Industry Academy Cooperation Foundation, Seoul (KR)

(72) Inventors: Sejoon Lim, Seoul (KR); Geesung Oh, Seoul (KR); Heejung Kim, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 246 days.

(21) Appl. No.: 17/742,535

(22) Filed: May 12, 2022

(65) Prior Publication Data
US 2023/0012531 A1    Jan. 19, 2023

(30) Foreign Application Priority Data

Jul. 12, 2021   (KR) .................. 10-2021-0090905
Aug. 12, 2021  (KR) .................. 10-2021-0106863

(51) Int. Cl.
*B60W 50/00*    (2006.01)
*B60W 40/10*    (2012.01)
(Continued)

(52) U.S. Cl.
CPC ........ *B60W 50/0097* (2013.01); *B60W 40/10* (2013.01); *G01C 21/3807* (2020.08);
(Continued)

(58) Field of Classification Search
CPC ............. B60W 50/0097; B60W 40/10; B60W 2554/4041; B60W 2556/40;
(Continued)

(56) References Cited

U.S. PATENT DOCUMENTS 10,928,820 B1 *   2/2021  Tao .................. B60W 60/00276
11,124,204 B1 *   9/2021  Narang .................. G06N 3/006
(Continued)

FOREIGN PATENT DOCUMENTS

KR    10-2133342 B1    7/2020
KR    10-2176483 B1   11/2020

OTHER PUBLICATIONS

Nachiket Deo, and Mohan M. Trivedi, "Convolutional Social Pooling for Vehicle Trajectory Prediction," arXiv:1805.06771v1 [cs.CV] May 15, 2018 (May 15, 2018) Total 9 pages.
(Continued)

*Primary Examiner* — Justin Holmes
(74) *Attorney, Agent, or Firm* — NKL Law; Jae Youn Kim (57) ABSTRACT

A vehicle trajectory prediction device is provided. The vehicle trajectory prediction device includes a transceiver, at least one processor, and at least one memory operatively connected with the at least one processor to store at least one instruction causing the at least one processor to perform operations. The operations receive first trajectory data for an ego-vehicle and second trajectory data for at least one neighbor-vehicle, obtain a first feature vector from a first extractor and obtain a second feature vector from a second extractor, obtain an interdependency feature vector between the ego-vehicle and the at least one neighbor-vehicle from a third extractor having mapping data generated by mapping the second feature vector to the second trajectory data as input data, and generate predicted trajectory data of the ego-vehicle from a trajectory generator having the first feature vector and the interdependency feature vector as input data.

17 Claims, 6 Drawing Sheets

(51) Int. Cl.
   *G01C 21/00* (2006.01)
   *G06N 3/044* (2023.01)
   *G06N 3/08* (2023.01)
(52) U.S. Cl.
   CPC ............... *G06N 3/044* (2023.01); *G06N 3/08* (2013.01); *B60W 2554/4041* (2020.02); *B60W 2556/40* (2020.02); *B60W 2556/45* (2020.02)
(58) Field of Classification Search
   CPC ........... B60W 2556/45; B60W 30/095; B60W 60/001; B60W 2556/10; G01C 21/3807; G01C 21/3407; G06N 3/044; G06N 3/08; G06N 3/0442; G06N 3/045; G06N 3/0464; G06N 3/084
   See application file for complete search history.

(56) References Cited

U.S. PATENT DOCUMENTS

2019/0129436 A1\* 5/2019 Sun .......................... G06N 3/08
2022/0144256 A1\* 5/2022 Narayanan ............... G06N 3/08

OTHER PUBLICATIONS

Seong Hyeon Park et al., "Sequence-to-Sequence Prediction of Vehicle Trajectory via LSTM Encoder-Decoder Architecture," arXiv:1802.06338v3 [cs.LG] Oct. 22, 2018 (Oct. 22, 2018) Total 7 pages.

\* cited by examiner

DEEP LEARNING-BASED VEHICLE TRAJECTORY PREDICTION DEVICE AND METHOD THEREFOR

CROSS-REFERENCE TO RELATED APPLICATIONS

This application claims priority under 35 U.S.C. § 119 to Korean Patent Application No. 10-2021-0090905 filed on Jul. 12, 2021, and No. 10-2021-0106863 filed on Aug. 12, 2021, in the Korean Intellectual Property Office, the disclosures of which are incorporated by reference herein in their entireties.

STATEMENT DESIGNATING GRACE PERIOD INVENTOR DISCLOSURE

Applicant notes that the publication made on May 15, 2021 for "A Study on Trade-off Evaluation by Simplifying Propagation Process of vehicle Trajectory Prediction Model Based on Deep Learning" by GEESUNG O H et al., pages 914-922, Vol. 46, No. 05 was a grace period inventor disclosure exception under 35 USC 102(b)(1)(A), and thus does not qualify as prior art.

BACKGROUND

Embodiments of the inventive concept described herein relate to a deep learning-based vehicle trajectory prediction device and a method therefor.

An advanced driver assistance system (ADAS) is a driver assistance system which allows the vehicle to recognize and determine a critical situation while driving by means of an advanced sensor to perform self-control or allows a driver to detect risk factors in advance. Although many automakers apply the ADAS to vehicles, the number of traffic accidents in 2019 increased by 5.7% compared to the previous year, and 75.5% thereof were vehicle-to-vehicle accidents. Thus, research on vehicle trajectory prediction is being conducted in various fields to more accurately recognize the risk of vehicle-to-vehicle accidents. Particularly, research using deep learning is attracting attention as it shows high prediction accuracy.

For a deep learning-based vehicle trajectory prediction model, a deep learning model becomes more complex to enhance prediction accuracy. Thus, the prediction time is gradually increasing. As such, the prediction accuracy and the prediction time have a trade-off relationship, but the problem of increasing the prediction time is overlooked for higher accuracy. Particularly, it is essential for the ADAS to quickly recognize a critical situation to safely control the vehicle from risk factors. Because such a series of tasks should be accomplished in a limited embedded environment, vehicle trajectory prediction needs to consider the prediction accuracy and the prediction time, that is, both of two pieces of performance.

Prior Patent Documents (Patent Document 1) Korean Patent No. 10-2176483
(Patent Document 2) Korean Patent No. 10-2133342

SUMMARY

Embodiments of the inventive concept provide a deep learning-based vehicle trajectory prediction device for suitably trading off prediction accuracy and a prediction time and a method therefor.

The technical problems to be achieved in the various examples of the inventive concept are not limited to the above-mentioned matters, and other technical problems that are not mentioned may be considered by those of ordinary skill in the art from various examples of the inventive concept to be described below.

According to an exemplary embodiment, a vehicle trajectory prediction device may include a transceiver, at least one processor, and at least one memory operatively connected with the at least one processor to store at least one instruction causing the at least one processor to perform operations. The operations may receive first trajectory data for an ego-vehicle and second trajectory data for at least one neighbor-vehicle through the transceiver, may obtain a first feature vector from a first extractor having the first trajectory data as input data and may obtain a second feature vector from a second extractor having the second trajectory data as input data, may obtain an interdependency feature vector between the ego-vehicle and the at least one neighbor-vehicle from a third extractor having mapping data generated by mapping the second feature vector to the second trajectory data as input data, and may generate predicted trajectory data of the ego-vehicle from a trajectory generator having the first feature vector and the interdependency feature vector as input data.

For example, the first extractor and the trajectory generator may be based on a long short term memory (LSTM) structure.

For example, the second extractor may be based on a fully-connected (FC) structure.

For example, the third extractor may be based on a structure sequentially including a convolution layer and a pooling layer.

For example, each of the first trajectory data and the second trajectory data may be obtained during a predetermined time interval within a predetermined observation range with respect to the ego-vehicle.

For example, the predetermined observation range may be a two-dimensional (2D) grid having a position of the ego-vehicle as an origin and being defined by a driving direction of the ego-vehicle and a direction perpendicular to the driving direction.

For example, the mapping data may be generated by mapping the second feature vector to a position corresponding to the second trajectory data within a tensor defined by the 2D grid and the predetermined time interval.

For example, the trajectory generator may use a cell-state vector of the first extractor as a cell-state initial vector of the trajectory generator.

According to an exemplary embodiment, a vehicle trajectory prediction method performed by a vehicle trajectory prediction device may include receiving first trajectory data for an ego-vehicle and second trajectory data for at least one neighbor-vehicle through a transceiver of the vehicle trajectory prediction device, obtaining a first feature vector from a first extractor having the first trajectory data as input data and obtaining a second feature vector from a second extractor having the second trajectory data as input data, obtaining an interdependency feature vector between the ego-vehicle and the at least one neighbor-vehicle from a third extractor having mapping data generated by mapping the second feature vector to the second trajectory data as input data, and generating predicted trajectory data of the ego-vehicle from a trajectory generator having the first feature vector and the interdependency feature vector as input data.

For example, each of the first trajectory data and the second trajectory data may be obtained during a predetermined time interval within a predetermined observation range with respect to the ego-vehicle. The predetermined observation range may be a 2D grid having a position of the ego-vehicle as an origin and being defined by a driving direction of the ego-vehicle and a direction perpendicular to the driving direction.

For example, the vehicle trajectory prediction method may further include generating the mapping data by mapping the second feature vector to a position corresponding to the second trajectory data within a tensor defined by the 2D grid and the predetermined time interval.

According to an exemplary embodiment, a vehicle trajectory prediction device may include a transceiver, at least one processor, and at least one memory operatively connected with the at least one processor to store at least one instruction causing the at least one processor to perform operations. The operations may predict a vehicle trajectory based on first trajectory data for an ego-vehicle, the first trajectory data being previously stored in the at least one memory, second trajectory data for at least one neighbor-vehicle, and a vehicle trajectory prediction model. The vehicle trajectory prediction model may include a first extractor that obtains a first feature vector by using the first trajectory data as input data, a second extractor that obtains a second feature vector by using the second trajectory data as input data, a third extract that obtains an interdependency feature vector between the ego-vehicle and the at least one neighbor-vehicle by using mapping data generated by mapping the second feature vector to the second trajectory data as input data, and a trajectory generator that generates predicted trajectory data of the ego-vehicle by using the first feature vector and the interdependency feature vector as input data.

The above-mentioned various embodiments of the inventive concept are only some of the preferred examples of the inventive concept, and several examples in which the technical features of the inventive concept are reflected may be derived and understood based on the following detailed description by those of ordinary skill in the art.

BRIEF DESCRIPTION OF DRAWINGS

The accompanying drawings are provided to aid understanding of various examples of the inventive concept, and provide various examples of the inventive concept together with a detailed description. However, the technical features of various examples of the inventive concept are not limited to a specific drawing, and features disclosed in each drawing may be combined with each other to constitute a new embodiment. Reference numerals in each drawing mean structural elements, and wherein.

DETAILED DESCRIPTION

Hereinafter, implementations according to the inventive concept will be described in detail with reference to the accompanying drawings. The detailed description to be disclosed hereinafter together with the accompanying drawings is intended to describe exemplary implementations of the inventive concept and is not intended to represent the only implementation form in which the inventive concept may be practiced. The following detailed description includes specific details to provide a thorough understanding of the inventive concept. However, one of ordinary skill in the art appreciates that the inventive concept may be practiced without these specific details.

In some cases, in order to avoid obscuring the concept of the inventive concept, well-known structures and devices may be omitted, or may be illustrated in a block diagram form centering on core functions of each structure and device. In addition, the same components will be described using the same reference numerals throughout the inventive concept.

Since various examples according to the concept of the inventive concept may be changed in various ways and have various forms, various examples are illustrated in the drawings and will be described in detail in the inventive concept. However, this is not intended to limit various examples according to the concept of the inventive concept to specific disclosed forms, and includes changes, equivalents, or substitutes included in the spirit and scope of the inventive concept.

Terms such as "first" or "second" may be used to describe various elements, but the elements should not be limited by the terms. The terms are only for the purpose of distinguishing one element from other elements, for example, without departing from the scope of the rights according to the concept of the inventive concept. The first element may be referred to as the second element, and similarly, the second element may also be referred to as the first element.

When an element is referred to as being "connected" or "coupled" to another element, it is understood that it may be directly connected or coupled to the other element, but other elements may exist in the middle. On the other hand, when an element is referred to as being "directly connected" or "directly coupled" to another element, it should be understood that there is no other element in the middle. Expressions describing the relationship between elements, for example, "between" and "just between" or "directly adjacent to" should be interpreted as well.

In various examples of the inventive concept, it should be interpreted that "/" and "," indicate "and/or". For example, "A/B" may refer to "A and/or B". In addition, "A, B" may refer to "A and/or B". In addition, "AB/C" may refer to "at least one of A, B, and/or C". In addition, "A, B, C" may refer to "at least one of A, B, and/or C".

In various examples of the inventive concept, it should be interpreted that "or" indicates "and/or". For example, "A or B" may include "only A", "only B", and/or "both of A and B". In other words, it should be interpreted that "or" indicates "additionally" or "alternatively".

The terms used in the inventive concept are only used to describe various specific examples, and are not intended to limit the inventive concept. Singular expressions include plural expressions unless the context clearly indicates otherwise. In the inventive concept, it is to be understood that terms such as "comprise" or "have" are intended to designate that the specified features, numbers, steps, operations, elements, parts, or combinations thereof exist, but do not previously preclude the possibility of the presence or addition of one or more other features, numbers, steps, operations, elements, parts, or combinations thereof.

Unless otherwise defined, all terms used herein including technical or scientific terms have the same meaning as commonly understood by one of ordinary skill in the art to which the inventive concept belongs. Terms as defined in a commonly used dictionary should be interpreted as having a meaning consistent with the meaning in the context of the related technology, and should not be interpreted as an ideal or excessively formal meaning unless explicitly defined in the inventive concept. Hereinafter, various examples of the inventive concept will be described in detail with reference to the accompanying drawings.

Vehicle Trajectory Prediction Problem

Figure 1:
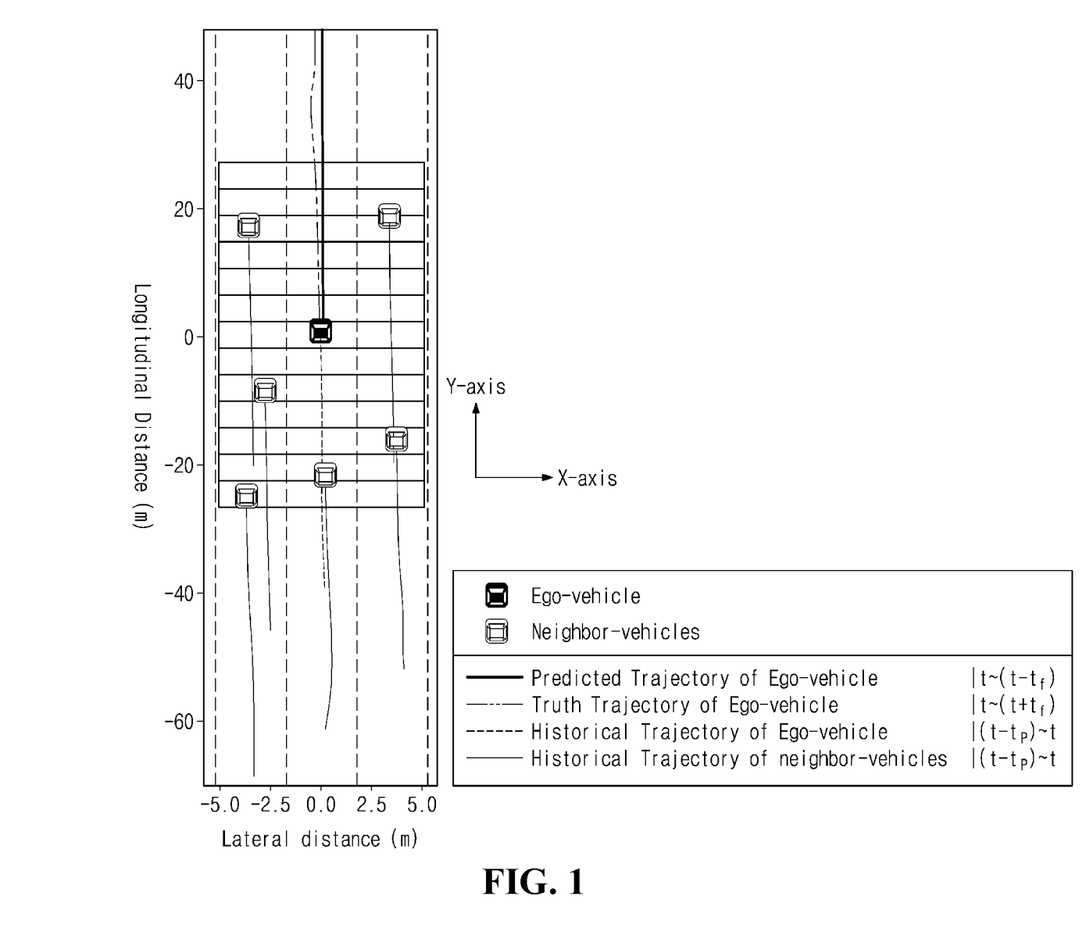
FIG. 1 is an overview diagram illustrating a vehicle trajectory prediction problem according to an embodiment of the inventive concept.

FIG. 1 is an overview diagram illustrating a vehicle trajectory prediction problem according to an embodiment of the inventive concept.

Referring to FIG. 1, the vehicle trajectory prediction problem to be addressed by a vehicle trajectory prediction device and a method therefor according to various embodiments of the inventive concept is applied to any road, a vehicle (hereinafter, referred to as an "ego-vehicle") which becomes a criterion randomly selected among a plurality of vehicles traveling any road, and the other vehicles (referred to as "neighbor-vehicles") except for the ego-vehicle among the plurality of vehicles.

An observation range to which the vehicle trajectory prediction problem is applied with respect to the ego-vehicle may be defined as a two-dimensional (2D) grid which has a position of the ego-vehicle as an origin and is defined by a driving direction of the ego-vehicle and a direction perpendicular to the driving direction. In other words, a Y-axis direction of the 2D grid may be the driving direction of the ego-vehicle, and an X-axis direction of the 2D grid may be the direction perpendicular to the driving direction.

The origin may be defined as an absolute position $x_0^{T_t}$, $y_0^{T_t}$ of the ego-vehicle at a predicted time point, that is, time $T_t$ when prediction is started.

A detailed range of the 2D grid may be variously set. For example, a detailed range associated with the Y-axis direction may be defined as l [m] in front of and behind (i.e., in the Y-axis direction) the ego-vehicle, and a detailed range associated with the X-axis direction may be defined as left and right w lines adjacent to a driving lane of the ego-vehicle. Here, l may be an integer, and w may be a natural number.

Alternatively, a detailed range of the 2D grid may be set to have an asymmetric range (e.g., l' [m] in front, l" [m] behind, left w' lanes, right w" lanes, and the like) with respect to the ego-vehicle.

As described above, when the observation range is defined as a relative coordinate system, the vehicle trajectory prediction device may be easily applied in an on-board form in the vehicle.

In the above-mentioned observation range, a trajectory of each of a plurality of vehicles may be defined by means of position coordinates for each d [Hz]. Herein, d is an integer. Trajectory data for the trajectory of each of the plurality of vehicles may be obtained during a predetermined time interval within the above-mentioned observation range. For convenience, in the inventive concept, trajectory data of the ego-vehicle is referred to as first trajectory data, and trajectory data of the neighbor-vehicle is referred to as second trajectory data.

The entire trajectory data including the first trajectory data and the second trajectory data may be defined by Equation 1 below.

$$X = [X_0, X_1, \ldots, X_N] \quad \text{[Equation 1]}$$

Herein, X denotes the trajectory data, and N denotes the number of the plurality of vehicles in the observation range. Furthermore, $X_0$ may be defined as, but not limited to, the trajectory data for the ego-vehicle.

Trajectory data of each of the plurality of vehicles corresponding to elements $X_0$ to $X_N$ of Equation 1 above may be defined as Equation 2 below.

$$X_i = \left[\left(x_i^{T_t - \frac{t}{d}} - x_0^{T_t}, y_i^{(T_t - \frac{t}{d})} - y_0^{T_t}\right)\right], \quad \text{[Equation 2]}$$
$$(t = 0, 1, \ldots, d \times T_p)$$

Herein, $X_i$ denotes the trajectory data of each vehicle, $x_i$ and $y_i$ denote the X-axis (a lateral distance of FIG. 1) and the Y-axis (a longitudinal distance of FIG. 1) of the 2D grid, respectively, and $T_p$ denotes a historical time interval when the trajectory data is collected with respect to the predicted time point.

An output value by means of addressing the vehicle trajectory prediction problem based on the trajectory data of Equation 2 above, that is, predicted trajectory data of the ego-vehicle may be defined by Equation 3 below.

$$\hat{Y} = \left[\left(x_0^{T_t + \frac{t}{d}} - x_0^{T_t}, y_0^{(T_t + \frac{t}{d})} - y_0^{T_t}\right)\right], \quad \text{[Equation 3]}$$
$$(t = 1, 2, \ldots, d \times T_f)$$

Herein, $\hat{Y}$ denotes the predicted trajectory data, and $T_f$ denotes the predicted time interval when the predicted trajectory data is generated with respect to the predicted time point.

The vehicle trajectory prediction device and the method therefor according to various embodiments of the inventive concept may address the above-mentioned vehicle trajectory prediction problem based on a historical trajectory of the ego-vehicle and a historical trajectory of the neighbor-vehicle, thus generating a predicted trajectory of the ego-vehicle. Hereinafter, a description will be given of the vehicle trajectory prediction device and the method therefor for addressing the above-mentioned vehicle trajectory prediction problem.

Vehicle Trajectory Prediction Device

Figure 2:
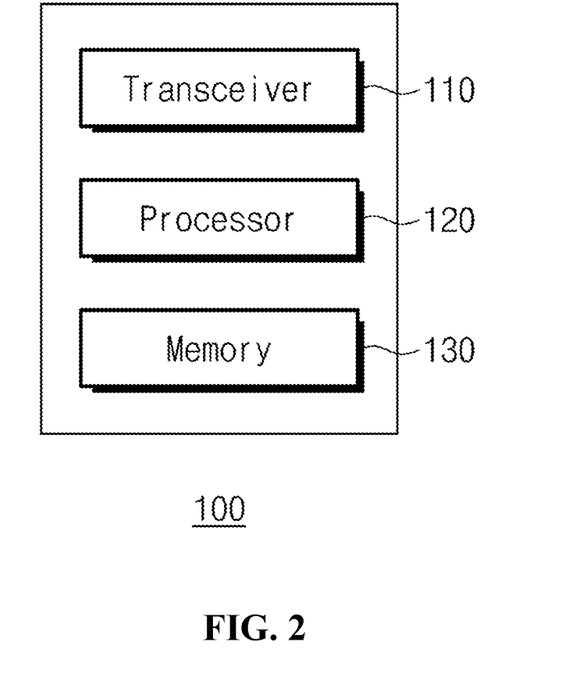
FIG. 2 is a block diagram of a vehicle trajectory prediction device according to an embodiment of the inventive concept.

FIG. 2 is a block diagram of a vehicle trajectory prediction device according to an embodiment of the inventive concept.

Referring to FIG. 2, a vehicle trajectory prediction device 100 according to an embodiment of the inventive concept may include a transceiver 110, a processor 120, and a memory 130.

The transceiver 110 may be connected with the processor 120 to transmit and/or receive a wired/wireless signal. For example, the transceiver 110 may be connected with various electronic control units (ECUs) of a vehicle over an inter-vehicle communication network. Herein, the inter-vehicle communication network may be, for example, but is not limited to, a controller area network (CAN), FlexRay, a local interconnect network (LIN), or an Ethernet.

Alternatively, the transceiver 110 may be connected with a server and/or a terminal over a wired/wireless communication network. Herein, the wireless communication network may include a mobile communication network, a wireless local area network (LAN), a short range wireless communication network, or the like. For example, the wireless communication network may include cellular communication which uses at least one of long-term evolution (LTE), LTE-advance (LTE-A), code division multiple access (CDMA), wideband CDMA (WCDMA), a universal mobile telecommunications system (UMTS), wireless broadband (WiBro), global system for mobile communications (GSM), or the like. For example, the wireless communication network may include at least one of wireless fidelity (WiFi), Bluetooth, Bluetooth low energy (BLE), ZigBee, near field communication (NFC), or radio frequency (RF).

The server and/or the terminal connected with the transceiver 110 over the wired/wireless communication network may transmit and receive, for example, data collected from the vehicle to be used as input data of an artificial intelligence model according to various examples of the inventive concept described below with the transceiver 110.

The transceiver 110 may include a transmitter and a receiver. The transceiver 110 may be interchangeably used with an RF unit. The transceiver 110 may transmit and receive a signal or data with the various ECUs, the server, and the terminal under control of the processor 120.

The processor 120 may be configured to include at least one processor, control the memory 130 and/or the transceiver 110, and implement a description, a function, a procedure, a proposal, a method, and/or an operational flowchart of the inventive concept. For example, the processor 120 may receive a signal or data through the transceiver 110 and may store information included in the signal or data in the memory 130. Furthermore, the processor 120 may process the information stored in the memory 130 to generate a signal or data and may transmit the generated signal or data through the transceiver 110.

The memory 130 may include at least one memory and may be connected with the processor 120 to store various pieces of information associated with an operation of the processor 120. For example, the memory 130 may perform some or all of processes controlled by the processor 120 or may store a software code including instructions for performing a description, a function, a procedure, a proposal, a method, and/or an operational flowchart of the inventive concept. Alternatively, the memory 130 may store data according to various embodiments of the inventive concept (e.g., first trajectory data for an ego-vehicle, second trajectory data for at least one neighbor-vehicle, and the like), a vehicle trajectory prediction model according to various embodiments, or the like.

Hereinafter, a description will be given of various operation examples of the vehicle trajectory prediction device 100. Various operation examples below may be included in an operation of the at least one processor 120 which is described above.

Figure 3:
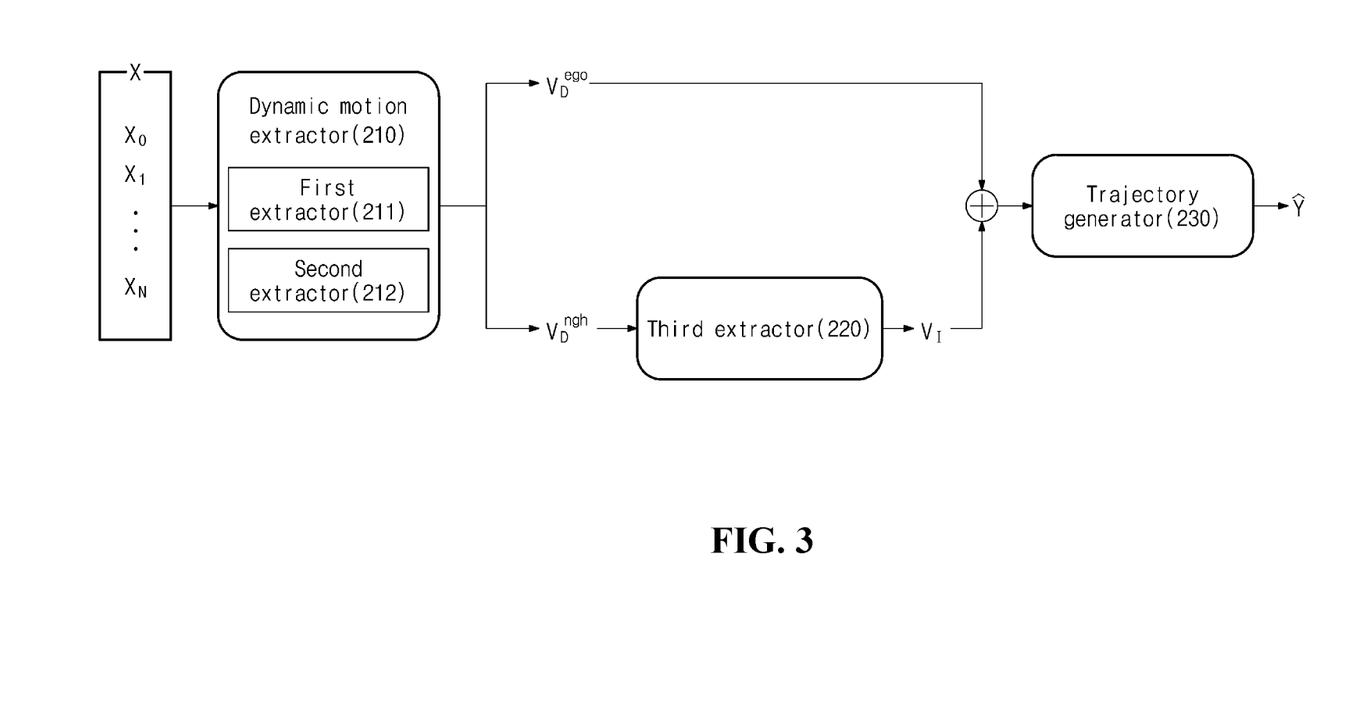
FIG. 3 is an overview diagram illustrating a vehicle trajectory prediction model performed by a vehicle trajectory prediction device according to an embodiment of the inventive concept.

FIG. 3 is an overview diagram illustrating a vehicle trajectory prediction model performed by a vehicle trajectory prediction device according to an embodiment of the inventive concept. A vehicle trajectory prediction model 200 in the inventive concept may refer to an artificial intelligence model used for a vehicle trajectory prediction device 100 to perform vehicle trajectory prediction. In other words, the vehicle trajectory prediction model 200 may be an artificial intelligence model for performing various operation examples of the vehicle trajectory prediction device 100 according to various examples of the inventive concept.

Referring to FIG. 3, the vehicle trajectory prediction model 200 may include a first extractor 211, a second extractor 212, a third extractor 220, and a trajectory generator 230.

The first extractor 211 and the second extractor 212 may be collectively referred to as a dynamic motion extractor 210. Herein, dynamic motion may be defined as output data of the dynamic motion extractor 210 which has trajectory data as input data, that is, a feature vector.

Input data of the first extractor 211 and input data of the second extractor 212 may be first trajectory data and second trajectory data, respectively. For operations of the first extractor 211 and the second extractor 212, the vehicle trajectory prediction device 100 may receive the first trajectory data for an ego-vehicle and the second trajectory data for at least one neighbor-vehicle.

The vehicle trajectory prediction device 100 may obtain a first feature vector $V_D^{ego}$ from the first extractor 211 which has the first trajectory data as input data and may obtain a second feature vector $V_D^{ngh}$ from the second extractor 212 which has the second trajectory data as input data. The first feature vector may be a feature vector obtained by means of the first trajectory data and the first extractor 211 with respect to the ego-vehicle. The second feature vector may be a feature vector obtained by means of the second trajectory data and the second extractor 212 with respect to the neighbor-vehicle.

The obtained first feature vector may be delivered to the trajectory generator 230, and the second feature vector may be delivered to the third extractor 220.

The vehicle trajectory prediction device 100 may obtain an interdependency feature vector between the at least one neighbor-vehicle from the third extractor 220 which has mapping data, which is generated by mapping the second feature vector obtained by means of the second extractor 212 to the second trajectory data, as input data. The interdependency feature vector may be a feature vector in which interdependency information between the neighbor-vehicle is reflected, which may be a feature vector obtained by means of the second feature vector and the third extractor 220.

The obtained interdependency feature vector may be delivered to the trajectory generator 230.

The vehicle trajectory prediction device 100 may generate predicted trajectory data of the ego-vehicle from the trajectory generator 230 which has the first feature vector obtained by means of the first extractor 211 and the interdependency feature vector obtained by means of the third extractor 220 as input data.

Hereinafter, a description will be given in detail of the first extractor 211, the second extractor 212, the third extractor 220, and the trajectory generator 230 with reference to FIGS. 4 and 5.

Each of the first extractor 211 and the second extractor 212 may be based on a long short term memory (LSTM) structure or a fully-connected (FC) structure.

Figure 4:
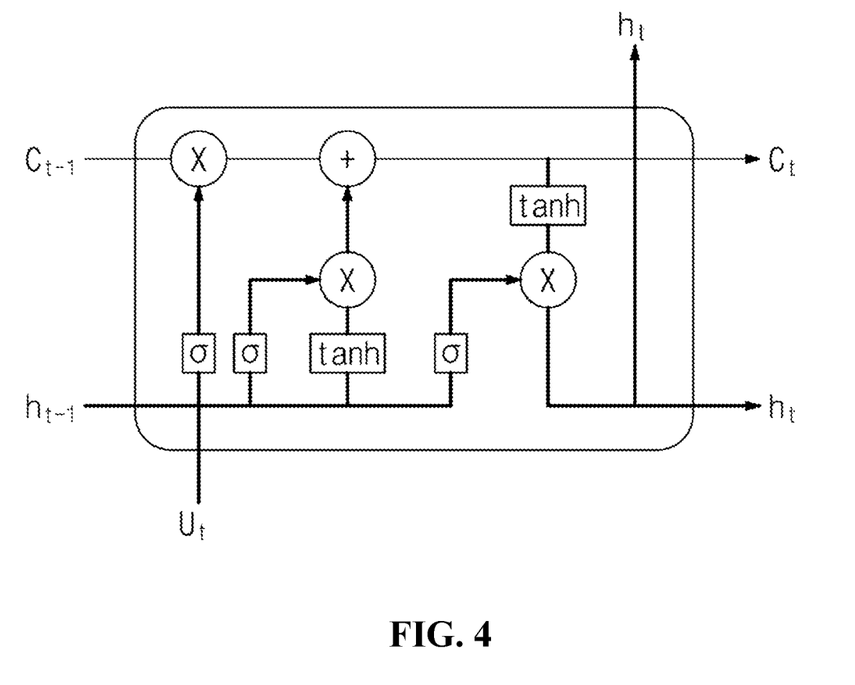
FIG. 4 illustrates an LSTM structure.

FIG. 4 illustrates an LSTM structure.

Referring to FIG. 4, the LSTM structure may be a kind of a recurrent neural network (RNN) structure, which may include a hidden-state and a cell-state responsible for long-term information. In the hidden-state, $h_{t-1}$ denotes the hidden-state initial vector, and $h_t$ denotes the new hidden-state vector. In the cell-state, $c_{t-1}$ denotes the cell-state initial vector, and $c_t$ denotes the new cell-state vector. The LSTM structure may determine how much to reflect input data $u_t$, the hidden-state initial state, and the cell-state initial vector in the new vector based on the hidden-state and the cell-state to generate the output value $h_t$.

An FC structure may be a structure in which nodes of each of a plurality of layers including the input layer and the output layer are fully connected with each other. The FC structure may output a feature vector through a one-time propagation process, as the input data is input at once.

A first extractor 211 and a second extractor 212 of FIG. 3 may output a feature vector based on one of the above-mentioned LSTM structure and the above-mentioned FC structure. For example, the first extractor 211 and the second extractor 212 may have the same structure or may have different structures.

As an example, the first extractor 211 may be based on the LSTM structure, and the second extractor 212 may be based on the FC structure. In other words, a first feature vector may be obtained from the LSTM structure, and a second feature vector may be obtained from the FC structure. When the first extractor 211 is based on the LSTM structure and when the second extractor 212 is based on the FC structure, a trade-off between prediction accuracy and a prediction time may be suitably performed.

Figure 5:
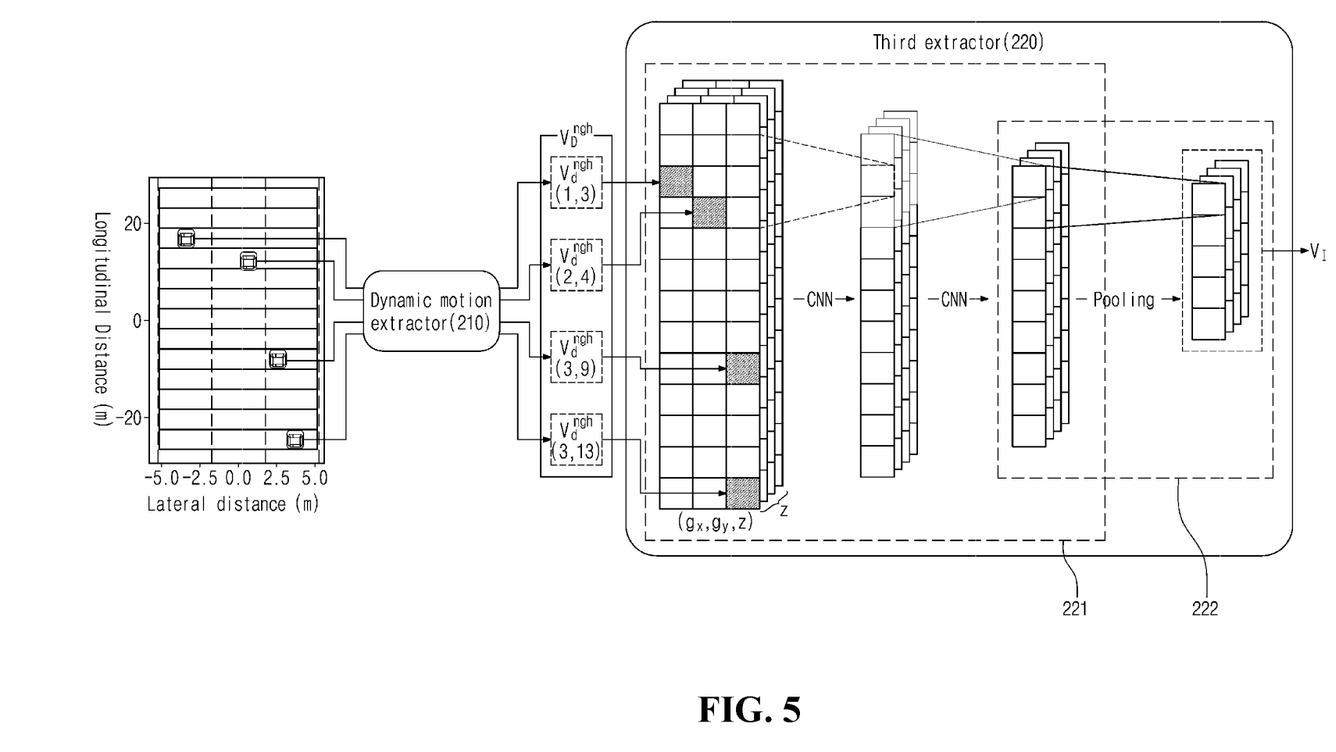
FIG. 5 illustrates a structure of a third extractor.

FIG. 5 illustrates a structure of a third extractor.

Referring to FIG. 5, a third extractor 220 may sequentially include a convolution layer 221 and a pooling layer 222. The convolution layer 221 may be provided in plural. The convolution layer 221 may extract features while searching for input data by means of a filter (or a kernel). The pooling layer 222 may extract a representative value among the features extracted from the convolution layer 221. The input data may sequentially pass through the above-mentioned convolution layer 221 and the above-mentioned pooling layer 221. Finally, the third extractor 220 may output an interdependency feature vector.

As described above, input data of the third extractor 220 may be mapping data generated by mapping a second feature vector $V_D^{ngh}$ obtained by means of a second extractor 212 of FIG. 3 to second trajectory data. In detail, the mapping data may be generated by mapping the second feature vector to a position corresponding to the second trajectory data within a tensor defined by a 2D grid and a predetermined time interval (e.g., $T_p$).

For example, the tensor may be represented as $(g_x, g_y, z)$ by the 2D grid defined with $g_x$ and $g_y$ and the predetermined time interval z. Thus, the tensor may include a plurality of 2D grids.

Because the second feature vector is obtained from each of a plurality of neighbor-vehicles as described above, each of the plurality of second feature vectors may be mapped to a position of each of the plurality of neighbor-vehicles, that is, a position corresponding to the second trajectory data, in the 2D grid included in the tensor. The mapping data mapped to the second grid may be represented as $V_D^{ngh}(g_x, g_y)$.

A trajectory generator 230 of FIG. 3 may be based on an LSTM structure or an FC structure. In other words, the trajectory generator 230 may output predicted trajectory data of an ego-vehicle by means of the LSTM structure by using a first feature vector and an interdependency feature vector as input data of the LSTM structure or the FC structure.

For example, when the trajectory generator 230 is based on the LSTM structure, it may sequentially output predicted trajectory data while repeatedly receiving the first feature vector and the interdependency feature vector $V_D^{ego}+V_I$. In this case, to perform more accurate trajectory prediction with regard to dynamic motion of the ego-vehicle, the trajectory generator 230 may use a cell-state vector of a first extractor 211 of FIG. 3 as a cell-state initial vector of the trajectory generator 230.

For example, when the trajectory generator 230 is based on the FC structure, it may receive the first feature vector and the interdependency feature vector $V_D^{ego}+V_I$ at once and may output predicted trajectory data through a one-time propagation process.

As described above, a vehicle trajectory prediction model 200 of FIG. 3 having the first extractor 211, the second extractor 212, the third extractor 220, and the trajectory generator 230 may be implemented in various forms. For example, the vehicle trajectory prediction model 200 may be implemented as first to third vehicle trajectory prediction models as described below. However, this is only an exemplary description, and the vehicle trajectory prediction model may be variously implemented according to the above-mentioned various examples of the inventive concept other than the first to third vehicle trajectory prediction models.

First Vehicle Trajectory Prediction Model (NON-LSTM)

For example, both of a dynamic motion extractor 210 and a trajectory generator 230 of each of an ego-vehicle and a neighbor-vehicle may be based on the FC structure in the first vehicle trajectory prediction model. In other words, both the first extractor 211 and the second extractor 212 may have the FC structure. Furthermore, the third extractor 220 may have a structure which sequentially includes the convolution layer 221 having mapping data as input data and the pooling layer 222.

Second Vehicle Trajectory Prediction Model (EGO-LSTM)

For example, in the second vehicle trajectory prediction model, the first extractor 211 may be based on the LSTM structure, and the second extractor 212 may be based on the FC structure, and the trajectory generator 230 may be based on the LSTM structure. Furthermore, the third extractor 220 may have a structure which sequentially includes the convolution layer 221 having mapping data as input data and the pooling layer 222.

Third Vehicle Trajectory Prediction Model (ALL-LSTM)

For example, in the third vehicle trajectory prediction model, both the dynamic motion extractor 210 and the trajectory generator 230 may be based on the LSTM structure. Furthermore, the third extractor 220 may have a structure which sequentially includes the convolution layer 221 having mapping data as input data and the pooling layer 222.

According to a vehicle trajectory prediction device 100 of FIG. 2 according to the above-mentioned various embodiments of the inventive concept, prediction accuracy and a prediction time which are key parameters in vehicle trajectory prediction may be suitably traded off. For example, as described above, the suitable trade-off of the prediction accuracy and the prediction time may be performed by an operation of extracting an interdependency feature obtained by means of the third extractor 220 which has mapping data as input data. For example, as described above, the suitable trade-off of the prediction accuracy and the prediction time may be performed according to a selection of a structure of an extractor used to extract dynamic motion of an ego-vehicle and a neighbor-vehicle.

Hereinafter, a description will be given of a vehicle trajectory prediction method performed by the vehicle trajectory prediction device 100 according to the above-mentioned various embodiments of the inventive concept. A detailed description of a duplicated portion will be omitted.

Vehicle Trajectory Prediction Method

Figure 6:
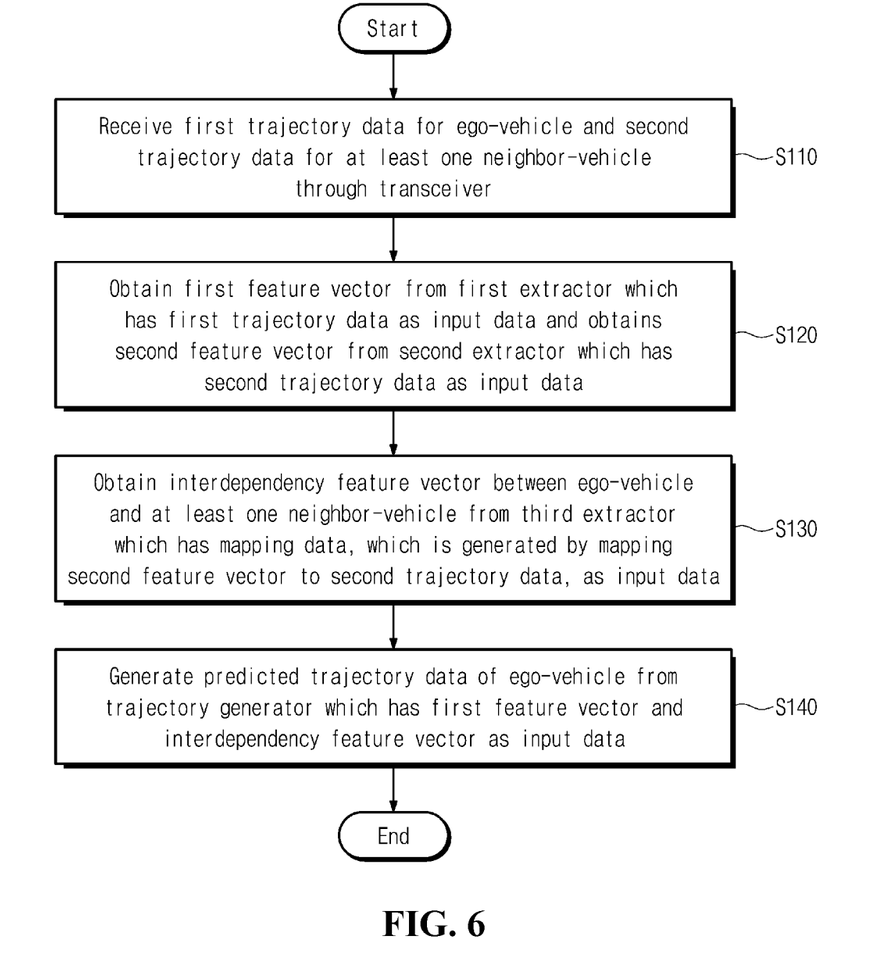
FIG. 6 is a flowchart of a vehicle trajectory prediction method according to an embodiment of the inventive concept.

FIG. 6 is a flowchart of a vehicle trajectory prediction method according to an embodiment of the inventive concept.

Referring to FIG. 6, in S110, a vehicle trajectory prediction device 100 of FIG. 2 may receive first trajectory data for an ego-vehicle and second trajectory data for at least one neighbor-vehicle through a transceiver 110 of FIG. 2.

Herein, each of the first trajectory data and the second trajectory data may be obtained during a predetermined time interval within a predetermined observation range with respect to the ego-vehicle. The predetermined observation range may be a 2D grid which has a position of the ego-vehicle as an origin and is defined by a driving direction of the ego-vehicle and a direction perpendicular to the driving direction.

In S120, the vehicle trajectory prediction device 100 may obtain a first feature vector from a first extractor 211 of FIG. 3, which has the first trajectory data as input data, and may obtain a second feature vector from a second extractor 212 of FIG. 3, which has the second trajectory data as input data.

In S130, the vehicle trajectory prediction device 100 may obtain an interdependency feature vector between the ego-vehicle and the at least one neighbor-vehicle from a third extractor 220 of FIG. 3, which has mapping data generated by mapping the second feature vector to the second trajectory data as input data.

S130 may include generate the mapping data by mapping the second feature vector to a position corresponding to the second trajectory data within a tensor defined by the 2D grid and a predetermined time interval.

In S140, the vehicle trajectory prediction device 100 may generate predicted trajectory data of the ego-vehicle from a trajectory generator 230 of FIG. 3, which has the first feature vector and the interdependency feature vector as input data.

Hereinafter, a description will be given of one experiment example of the vehicle trajectory prediction device 100 and the method therefor according to the above-mentioned various embodiments of the inventive concept.

Experiment Example

<Dataset>

An actual road vehicle trajectory data next generation imulation (NGSIM) dataset provided by the United States Federal Highway Administration is used to learn and evaluate a deep learning-based vehicle trajectory prediction model. The NGSIM dataset is a dataset in which movement trajectories of following vehicles, which are obtained by collecting data of vehicles traveling on certain sections of U.S. Interstate 80 and General National Route 101 by means of cameras, are recorded in the form of coordinates. Because the NGSIM dataset is data observed at intervals of 10 [Hz] for 45 minutes for each line and includes a position of a vehicle, a size of the vehicle, a speed of the vehicle, and preceding vehicle following information other than the vehicle movement trajectory, it is used for various vehicle related studies. NGSIM data is divided in the ratio of about 85% to about 15%. 85% are used to learn a deep learning model and performance evaluation proceeds using data of the remaining 15%.

<Experiment Contents>

Learning and performance evaluation of the above-mentioned first to third vehicle trajectory prediction models proceed to identify changes in performance of prediction accuracy and a prediction time by means of simplifying the propagation process of the dynamic motion extractor 210 and the trajectory generator 230.

Experiments on all the vehicle trajectory prediction models proceed in the same condition. The observation range is designated as 27.4 [m] (total 54.8 [m]) in front and behind and as adjacent left and right one lanes (total three lanes). Historical movement trajectories of all vehicles for three seconds within the observation range are input to output a future predicted trajectory of the ego-vehicle up to five seconds. The trajectory of the vehicle may be represented by means of position coordinates at intervals of 5 [Hz]. Deep learning proceeds in the Linux PC (i9-9980XE, Nvidia Titan RTX) environment and is performed in the direction of minimizing a mean squared error between the predicted trajectory and the actual trajectory.

The Adam algorithm is used to optimize internal parameters of the vehicle trajectory prediction model. A learning rate is set to 0.001. Pieces of primary and secondary momentum are 0.9 and 0.009, respectively. Repeated learning is performed over 90,000,000 times. All of learning and evaluation proceed in the TensorFlow framework. The performance of prediction accuracy of the vehicle trajectory prediction model, the learning of which is completed, is compared with the result output by the model with respect to a root mean squared error of an actual trajectory, which is present in the dataset.

The prediction time is measured in units of [ms] as a time until the predicted trajectory of the ego-vehicle is output from the moment the historical movement trajectories of all vehicles are input to the vehicle trajectory prediction model. All performance evaluation is accomplished in the Linux PC environment, but verification in the Nvidia Jetson TX2 Board environment proceeds to measure a prediction time in the embedded environment.

Experiment Result

The prediction accuracy of the first to third vehicle trajectory prediction models is shown in Table 1 below.

TABLE 1

| | Predict Horizon(s) | NON-LSTM(m) | EGO-LSTM(m) | ALL-LSTM(m) |
|---|---|---|---|---|
| FDE (Final Distance Error) | 1 | 0.635 | 0.612 | 0.611 |
| | 2 | 1.371 | 1.343 | 1.322 |
| | 3 | 2.291 | 2.209 | 2.225 |
| | 4 | 3.477 | 3.367 | 3.396 |
| | 5 | 4.964 | 4.856 | 4.840 |
| ADE (Average Distance Error) | 1 | 0.847 | 0.400 | 0.398 |
| | 2 | 0.975 | 0.804 | 0.793 |
| | 3 | 1.366 | 1.258 | 1.255 |
| | 4 | 1.910 | 1.813 | 1.819 |
| | 5 | 2.594 | 2.500 | 2.510 |

In Table 1 above, five seconds which are a prediction range is divided and compared at intervals of one second. The average distance error (ADE) indicates the average of errors from the predicted time point to the corresponding time, and the final distance error (FDE) indicates the error when compared with respect to only the corresponding time. Particularly, it may be seen that the second vehicle trajectory prediction model EGO-LSTM and the third vehicle trajectory prediction model ALL-LSTM have advantages in terms of prediction accuracy because showing almost similar errors in all ranges.

The prediction time of each of the first to third vehicle trajectory prediction models is shown in Table 2 below.

TABLE 2

|  | PC | TX2 Board |
| --- | --- | --- |
| NON-LSTM(ms) | 8.335 | 185.963 |
| EGO-LSTM(ms) | 10.884 | 187.253 |
| ALL-LSTM(ms) | 12.908 | 191.277 |

Referring to Table 2 above, it may be seen that the first and second vehicle trajectory prediction models show excellent performance in terms of the prediction time.

Particularly, it may be seen that the prediction accuracy and the prediction time are suitably traded off as the second vehicle trajectory prediction model shows high prediction accuracy and shortens the prediction time.

Because examples of the proposed scheme in the above-mentioned description are able to be included in one of implementation methods of the inventive concept, it is a clear fact that they may be regarded as some kind of proposed schemes. Furthermore, the described proposed schemes may be implemented independently, but may be implemented in the form of a combination (or merging) of some proposed schemes.

The following effects are given according to various embodiments of the inventive concept.

According to various embodiments of the inventive concept, the deep learning-based vehicle trajectory prediction device and the method therefor are provided to suitably trade off prediction accuracy and a prediction time.

The effect according to the inventive concept is not limited to the above-mentioned effects, and another effect not mentioned will be clearly understood by those of ordinary skill in the art related to the inventive concept from the following detailed description.

Examples of the inventive concept disclosed as described above have been provided to enable any person skilled in the art related to the inventive concept to implement and execute the inventive concept. Although the above has been described with reference to examples of the inventive concept, those skilled in the art may variously modify and change the examples of the inventive concept. Thus, the inventive concept is not intended to be limited to the examples described herein, but is to assign the widest scope consistent with the principles and novel features disclosed herein. What is claimed is:

What is claimed is:

1. A vehicle trajectory prediction device, comprising:
a transceiver;
at least one processor; and
at least one memory operatively connected with the at least one processor and configured to store at least one instruction causing the at least one processor to perform operations,
wherein the operations receive first trajectory data for an ego-vehicle and second trajectory data for at least one neighbor-vehicle through the transceiver, obtain a first feature vector from a first extractor having the first trajectory data as input data and obtain a second feature vector from a second extractor having the second trajectory data as input data, obtain an interdependency feature vector of the at least one neighbor-vehicle from a third extractor having mapping data generated by mapping the second feature vector to the second trajectory data as input data, and generate predicted trajectory data of the ego-vehicle from a trajectory generator having the first feature vector and the interdependency feature vector as input data,
wherein the first extractor and the trajectory generator are based on a long short term memory (LSTM) structure, and
the second extractor is based on a fully-connected (FC) structure.

2. The vehicle trajectory prediction device of claim 1, wherein the third extractor is based on a structure sequentially including a convolution layer and a pooling layer.

3. The vehicle trajectory prediction device of claim 1, wherein each of the first trajectory data and the second trajectory data is obtained during a predetermined time interval within a predetermined observation range with respect to the ego-vehicle.

4. The vehicle trajectory prediction device of claim 3, wherein the predetermined observation range is a two-dimensional (2D) grid having a position of the ego-vehicle as an origin and being defined by a driving direction of the ego-vehicle and a direction perpendicular to the driving direction.

5. The vehicle trajectory prediction device of claim 4, wherein the mapping data is generated by mapping the second feature vector to a position corresponding to the second trajectory data within a tensor defined by the 2D grid and the predetermined time interval.

6. The vehicle trajectory prediction device of claim 1, wherein the trajectory generator uses a cell-state vector of the first extractor as a cell-state initial vector of the trajectory generator.

7. A vehicle trajectory prediction method performed by a vehicle trajectory prediction device, the vehicle trajectory prediction method comprising:
receiving first trajectory data for an ego-vehicle and second trajectory data for at least one neighbor-vehicle through a transceiver of the vehicle trajectory prediction device;
obtaining a first feature vector from a first extractor having the first trajectory data as input data and obtaining a second feature vector from a second extractor having the second trajectory data as input data;
obtaining an interdependency feature vector of the at least one neighbor-vehicle from a third extractor having mapping data generated by mapping the second feature vector to the second trajectory data as input data; and
generating predicted trajectory data of the ego-vehicle from a trajectory generator having the first feature vector and the interdependency feature vector as input data,
wherein the first extractor and the trajectory generator are based on a long short term memory (LSTM) structure, and
the second extractor is based on a fully-connected (FC) structure.

8. The vehicle trajectory prediction method of claim 7, wherein each of the first trajectory data and the second trajectory data is obtained during a predetermined time interval within a predetermined observation range with respect to the ego-vehicle, and
wherein the predetermined observation range is a 2D grid having a position of the ego-vehicle as an origin and being defined by a driving direction of the ego-vehicle and a direction perpendicular to the driving direction.

9. The vehicle trajectory prediction method of claim 8, further comprising:
generating the mapping data by mapping the second feature vector to a position corresponding to the second trajectory data within a tensor defined by the 2D grid and the predetermined time interval.

10. A vehicle trajectory prediction device, comprising:
a transceiver;
at least one processor; and
at least one memory operatively connected with the at least one processor and configured to store at least one instruction causing the at least one processor to perform operations,
wherein the operations predict a vehicle trajectory based on first trajectory data for an ego-vehicle, the first trajectory data being previously stored in the at least one memory, second trajectory data for at least one neighbor-vehicle, and a vehicle trajectory prediction model, and
wherein the vehicle trajectory prediction model includes:
a first extractor configured to obtain a first feature vector by using the first trajectory data as input data;
a second extractor configured to obtain a second feature vector by using the second trajectory data as input data;
a third extract configured to obtain an interdependency feature vector of the at least one neighbor-vehicle by using mapping data generated by mapping the second feature vector to the second trajectory data as input data; and
a trajectory generator configured to generate predicted trajectory data of the ego-vehicle by using the first feature vector and the interdependency feature vector as input data,
wherein
the first extractor and the trajectory generator are based on a long short term memory (LSTM) structure, and
the second extractor is based on a fully-connected (FC) structure.

11. The vehicle trajectory prediction device of claim 10, wherein the third extractor is based on a structure sequentially including a convolution layer and a pooling layer.

12. The vehicle trajectory prediction device of claim 10, wherein each of the first trajectory data and the second trajectory data is obtained during a predetermined time interval within a predetermined observation range with respect to the ego-vehicle.

13. The vehicle trajectory prediction device of claim 12, wherein the predetermined observation range is a 2D grid having a position of the ego-vehicle as an origin and being defined by a driving direction of the ego-vehicle and a direction perpendicular to the driving direction.

14. The vehicle trajectory prediction device of claim 13, wherein the mapping data is generated by mapping the second feature vector to a position corresponding to the second trajectory data within a tensor defined by the 2D grid and the predetermined time interval.

15. The vehicle trajectory prediction device of claim 10, wherein the trajectory generator uses a cell-state vector of the first extractor as a cell-state initial vector of the trajectory generator.

16. The vehicle trajectory prediction device of claim 10, wherein the trajectory generator sequentially outputs the predicted trajectory data while repeatedly receiving the first feature vector and the interdependency feature vector.

17. The vehicle trajectory prediction device of claim 10, wherein the trajectory generator outputs the predicted trajectory data through a one-time propagation process by receiving the first feature vector and the interdependency feature vector at once.

* * * * *